United States Patent
Meron et al.

(10) Patent No.: US 7,150,527 B2
(45) Date of Patent: Dec. 19, 2006

(54) PROGRESSIVE POWER SEMI-FINISHED SPECTACLE LENS BLANKS FOR ASTIGMATIC PRESBYOPES

(75) Inventors: Eyal Meron, Upper Galilee (IL); Jacob Rubinstein, Bloomington, IN (US)

(73) Assignee: Eyal Optical Industry, Hasharon Hatichon (IL)

( * ) Notice: Subject to any disclaimer, the term of this patent is extended or adjusted under 35 U.S.C. 154(b) by 28 days.

(21) Appl. No.: 10/919,326

(22) Filed: Aug. 17, 2004

(65) Prior Publication Data
US 2006/0050235 A1   Mar. 9, 2006

(51) Int. Cl.
G02C 7/06   (2006.01)
(52) U.S. Cl. .................. 351/169; 351/176; 351/177
(58) Field of Classification Search ................ 351/169, 351/177, 176
See application file for complete search history.

(56) References Cited

U.S. PATENT DOCUMENTS

| | | | | |
|---|---|---|---|---|
| 4,426,139 A | * | 1/1984 | van Ligten et al. | 351/169 |
| 5,861,935 A | * | 1/1999 | Morris et al. | 351/169 |
| 6,193,370 B1 | * | 2/2001 | Shirayanagi | 351/177 |
| 6,302,540 B1 | | 10/2001 | Katzman et al. | |
| 6,655,803 B1 | | 12/2003 | Rubinstein et al. | |
| 2003/0090623 A1 | | 5/2003 | Rubinstein et al. | |

OTHER PUBLICATIONS

A. Keating, "A system matrix for astigmatic optical systems: I. Introduction and dloptric power relation", American Journal of Optometry and Physiological Optics, vol. 58, 810-819, published 1981.

* cited by examiner

Primary Examiner—Scott J. Sugarman
(74) Attorney, Agent, or Firm—Pearl Cohen Zedek Latzer, LLP

(57) ABSTRACT

An optical lab is provided with a set of different progressive power semi-finished spectacle lens blanks for different combinations of base curve, add power, cylinder and axis, where each semi-finished lens blank in the set has an unfinished surface and a progressive surface with a particular base curve and a particular add power. The progressive surface has been designed to provide optimal optical performance of a lens one surface of which is the progressive surface and another surface of which is a toric surface of a particular non-zero cylinder and a particular axis. Given a prescription of an astigmatic presbyope, the optical lab will select from the set the appropriate semi-finished lens blank and will surface the unfinished surface with the appropriate toric surface so that the progressive power spectacle lens matches the prescription.

18 Claims, 4 Drawing Sheets

PROGRESSIVE POWER SEMI-FINISHED SPECTACLE LENS BLANKS FOR ASTIGMATIC PRESBYOPES

BACKGROUND OF THE INVENTION

Progressive power lenses are used to correct the vision of people suffering from presbyopia. Presbyopia is a condition in which the eye loses some or all of its ability to accommodate, i.e. to focus sharply at nearby objects. The curvature of the lens of the eye changes as the eye focuses on objects at different distances from the eye. As people age, their eyes become less elastic and therefore can change the curvature of the lens only to a certain degree, if at all. An individual's prescription for a progressive power lens includes a distance-vision optical power (a spherical correction) and an add power (the change in optical power required for near vision, also a spherical correction). The distance vision correction may be designed for far distances, as in driving, for example, or for closer distances, as in computer use, for example. The prescription may also include cylinder and axis for correcting astigmatism of the individual. An astigmatic presbyope is a person whose prescription includes a distance-vision optical power, a non-zero add power, a non-zero cylinder and an axis.

The standard business practice in the progressive power spectacle lenses market is to design and manufacture progressive power semi-finished spectacle lens blanks. One surface (typically the front surface) of a progressive power semi-finished spectacle lens blank is a finished progressive surface, and the other surface (typically the back surface) is unfinished and may be spherical. The progressive surface is designed to have a particular base curve and add power. The base curve, is the spherical curve of the distance-vision region of the progressive surface. The add power is the difference in optical power between the near-vision region of the progressive surface and the distance-vision region.

A progressive power semi-finished spectacle lens blank having a particular base curve and a particular add power is suitable for a range of distance-vision optical powers, the range being dependent for example, on the material and refractive index of the semi-finished lens blank. For example, the Shamir Genesis™ lens available from Shamir Insight, Inc. in San Diego, Calif., is made from plastic with an index of 1.6. Semi-finished spectacle lens blanks are available with a base curve of 1.5 D, 3.0 D, 5.0 D, 6.5 D and 7.5 D, and with an add power from +0.75 D to +3.50 D, in steps of 0.25 D. The range of distance-vision optical powers for which each semi-finished spectacle lens blank is suitable is summarized in the table below:

| Availability Table - Shamir Genesis ™ (plastic 1.6) | | | | |
|---|---|---|---|---|
| Base 1.5 | Base 3.0 | Base 5.0 | Base 6.5 | Base 7.5 |
| −11.25 to −6.25 | −6.00 to −2.00 | −1.75 to +1.00 | +1.25 to +3.25 | +3.50 to +7.00 |

Different Shamir Genesis™ semi-finished spectacle lens blanks therefore correspond to different combinations of base curve and add power. If the different combinations include five base curves (1.5, 3.0, 5.0, 6.5 and 7.5) and twelve add powers (+0.75, +1.00, +1.25, +1.50, +1.75, +2.00, +2.25, +2.50, +2.75, +3.00, +3.25 and +3.50), then a complete set to cover these combinations would include sixty different progressive power semi-finished spectacle lens blanks.

In general, a manufacturer will typically create a finite set of progressive power semi-finished lens blanks of a design family for a particular material and index. Each progressive power semi-finished lens blank in the set corresponds to a different combination of base curve and add power. The range of distance-vision optical powers for which a semi-finished lens blank of a particular base curve and add power is suitable is determined by the material, index and design.

Optical labs then keep a stock of progressive power semi-finished lens blanks of the design family. When preparing a progressive power spectacle lens for an individual, the lab surfaces and polishes the unfinished surface of the semi-finished spectacle lens blank to fit the individual's prescription. If the individual's prescription does not include astigmatism correction, then the unfinished surface of the semi-finished spectacle lens blank is surfaced and polished so that the prescribed distance-vision optical power is provided by the finished progressive power spectacle lens. The surfacing may involve adjusting the spherical curvature of the unfinished surface. If the individual's prescription includes astigmatism correction, then the unfinished surface is surfaced and polished so that the prescribed distance-vision optical power, the prescribed cylinder and the prescribed axis are provided by the finished progressive power spectacle lens. The surfacing may involve adjusting the spherical curvature of the unfinished surface and adding a toric component to the unfinished surface of the lens.

The design of a progressive surface may require complex balancing of competing interests, and may involve the consideration of light coming from different directions and different distances. One measure of optical performance of a progressive power spectacle lens is the distribution of unwanted astigmatism. The design of the progressive surface may have involved an assumption that the other surface of the lens is spherical. When the progressive surface is paired instead with a toric surface, without taking into account the complex interaction of the toric surface with the progressive surface, this may degrade the optical performance of the resulting lens. For example, using identical progressive power semi-finished spectacle lens blanks to match a prescription of SPHERE: −1.50 D, ADD: +2.00 D and to match a prescription of SPHERE: −1.50 D, ADD: +2.00 D, CYLINDER: −3.00 D, AXIS: 45 degrees may result in progressive power spectacle lenses having significantly different optical performance. In particular, the progressive power spectacle lens matching the prescription of SPHERE: −1.50 D, ADD: +2.00 D, CYLINDER: −3.00 D, AXIS: 45 degrees may have a less desirable distribution of unwanted (residual) astigmatism.

BRIEF DESCRIPTION OF THE DRAWINGS AND APPENDIX A

Embodiments of the invention are illustrated by way of example and not limitation in the figures of the accompanying drawings, in which like reference numerals indicate corresponding, analogous or similar elements, and in which.

Figure 3:
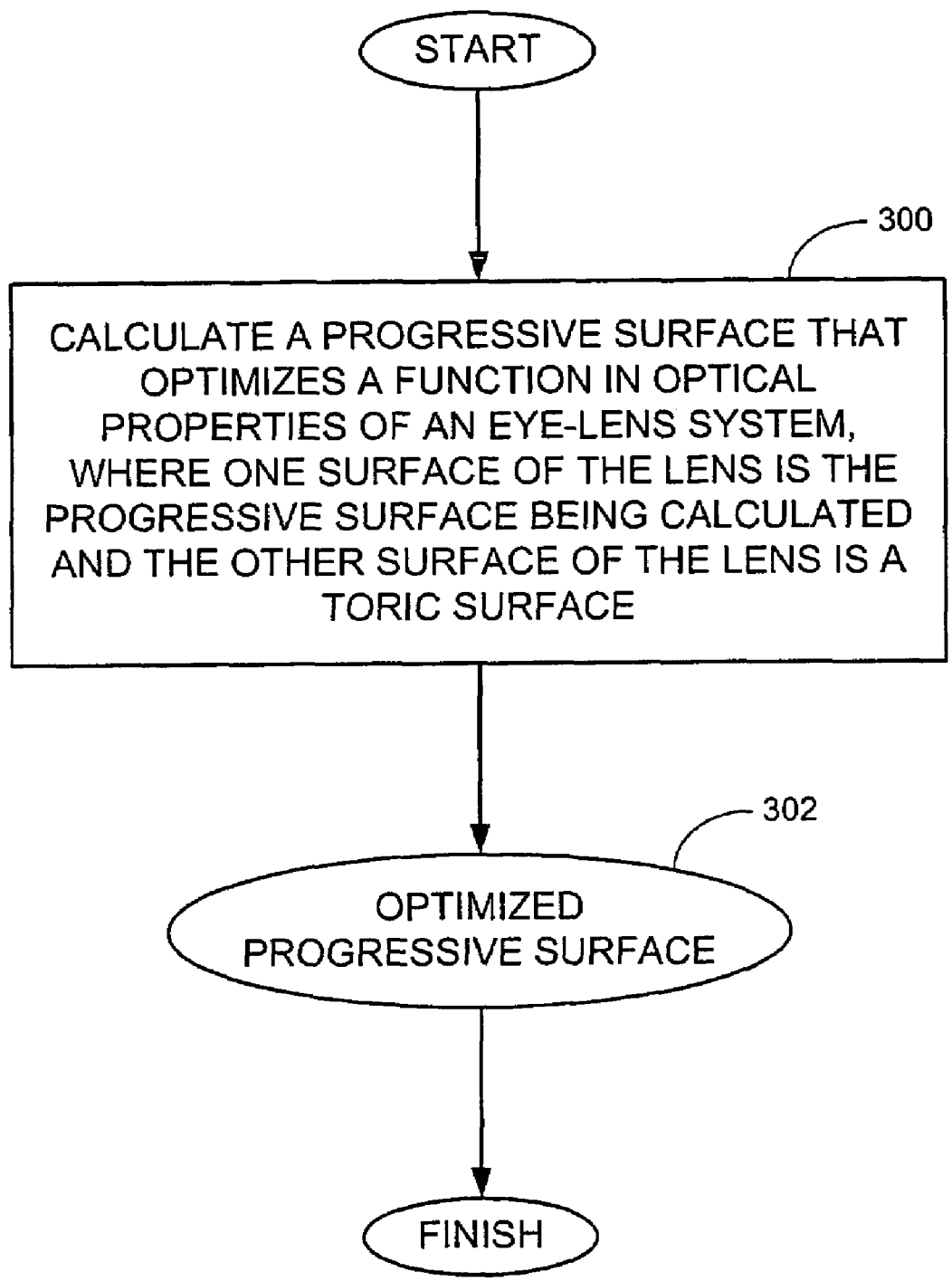
Figure 4:
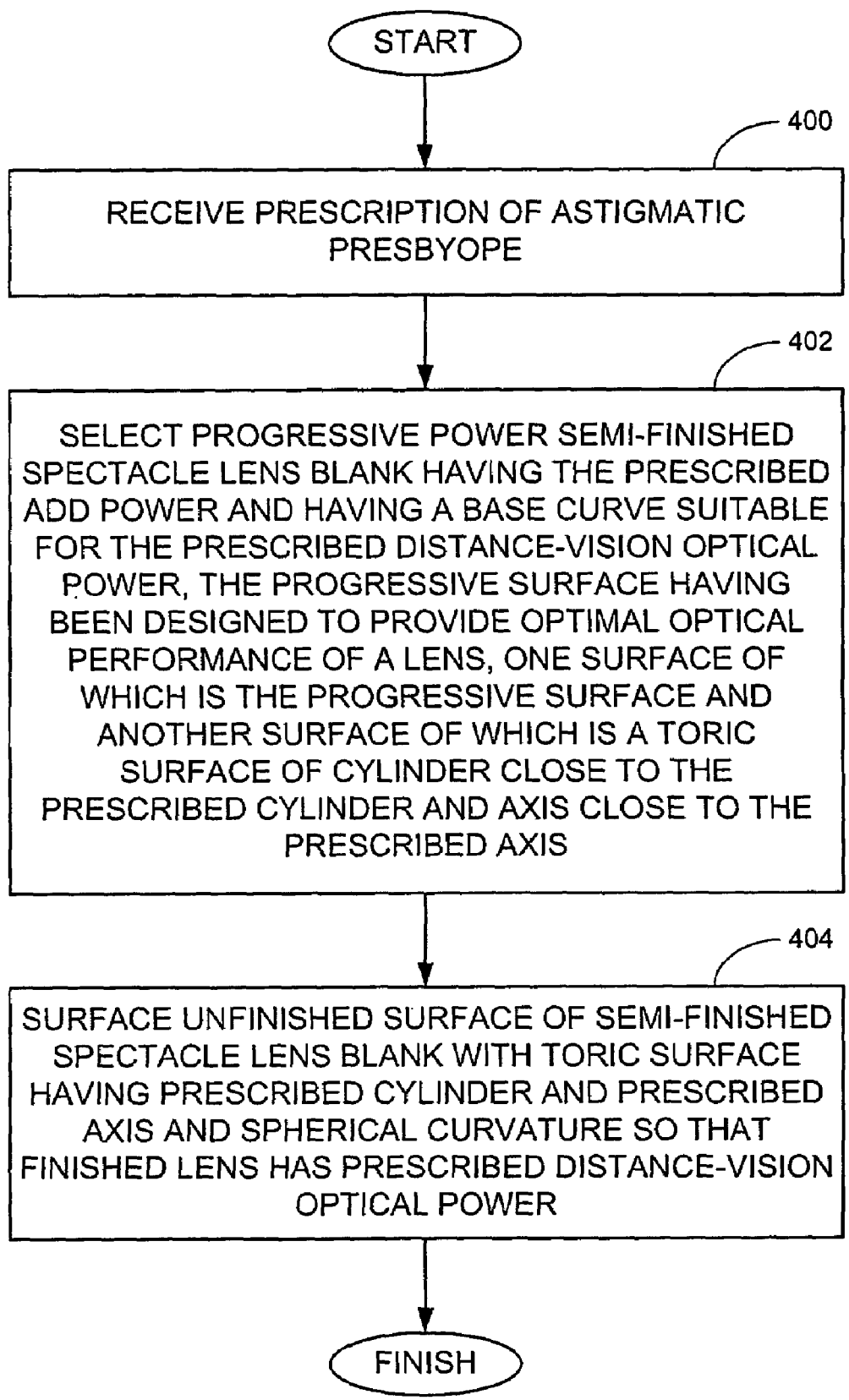

FIG. 3 is a flowchart of another exemplary method for designing a progressive surface of a progressive power semi-finished spectacle lens blank according to some embodiments of the invention; and FIG. 4 is a flowchart of an exemplary method for producing a progressive power spectacle lens for an astigmatic presbyope from a progressive power semi-finished spectacle lens blank according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods and procedures have not been described in detail so as not to obscure the present invention.

Figure 1:
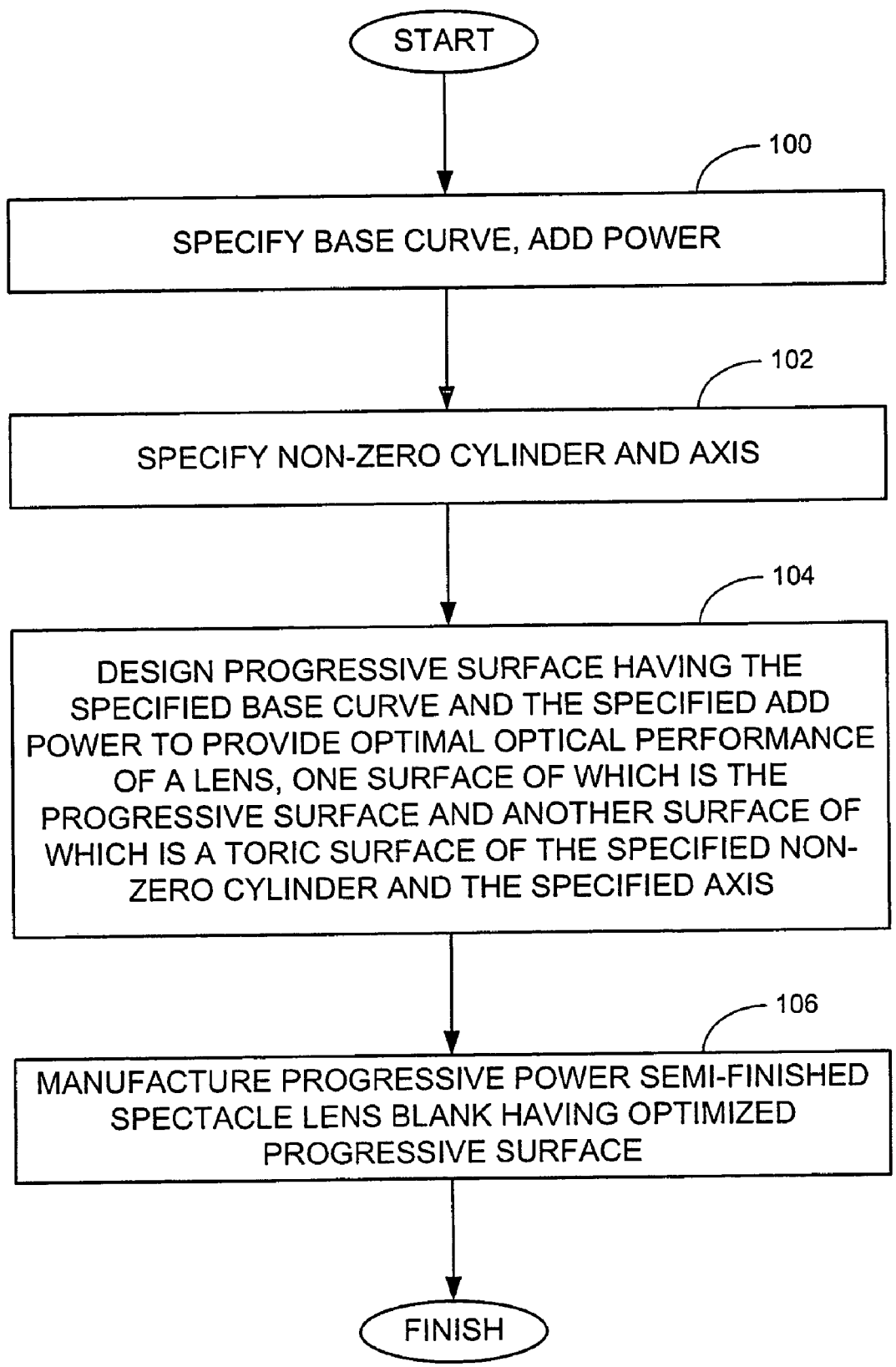
FIG. 1 is a flowchart of an exemplary method for designing and manufacturing a progressive power semi-finished spectacle lens blank according to some embodiments of the invention.

FIG. 1 is a flowchart of an exemplary method for designing and manufacturing a progressive power semi-finished spectacle lens blank according to some embodiments of the invention. A lens designer specifies a base curve and an add power (100). The lens designer also specifies a non-zero cylinder and an axis representing an astigmatism correction to be added to the unfinished surface of the semi-finished spectacle lens blank by an optical lab (102). The lens designer then designs a progressive surface having the specified base curve and the specified add power (104). The progressive surface is designed to provide optimal optical performance of a lens one surface of which is the progressive surface and another surface of which is a toric surface of the specified non-zero cylinder and the specified axis (104). A progressive power semi-finished spectacle lens blank is manufactured having the resulting optimized progressive surface (106).

The unfinished surface of the progressive power semi-finished spectacle lens blank may be spherical, aspherical, toric or even another progressive surface.

The method of FIG. 1 is repeated by the lens designer and manufacturer for different combinations of base curve, add powers, cylinder and axis. For example, the different combinations could include four base curves (1.5, 3.0, 5.0 and 7.0), nine add powers (+1.00, +1.25, +1.50, +1.75, +2.00, +2.25, +2.50, +2.75 and +3.00), fourteen different cylinder values from −0.75 D to −4.00 D in steps of 0.25 D, and thirteen different axis values from 0 degrees to 180 degrees in steps of 15 degrees. In this example, by repeating the method of FIG. 1 for each of these 6552 different combinations, the lens designer and manufacturer would design and manufacture 6552 different progressive power semi-finished lens blanks. In practice, the design steps (100, 102, and 104) of the method of FIG. 1 will likely be repeated for different combinations of base curve, add power, cylinder and axis before the manufacturing step (106) of the method of FIG. 1 is performed.

Figure 2:
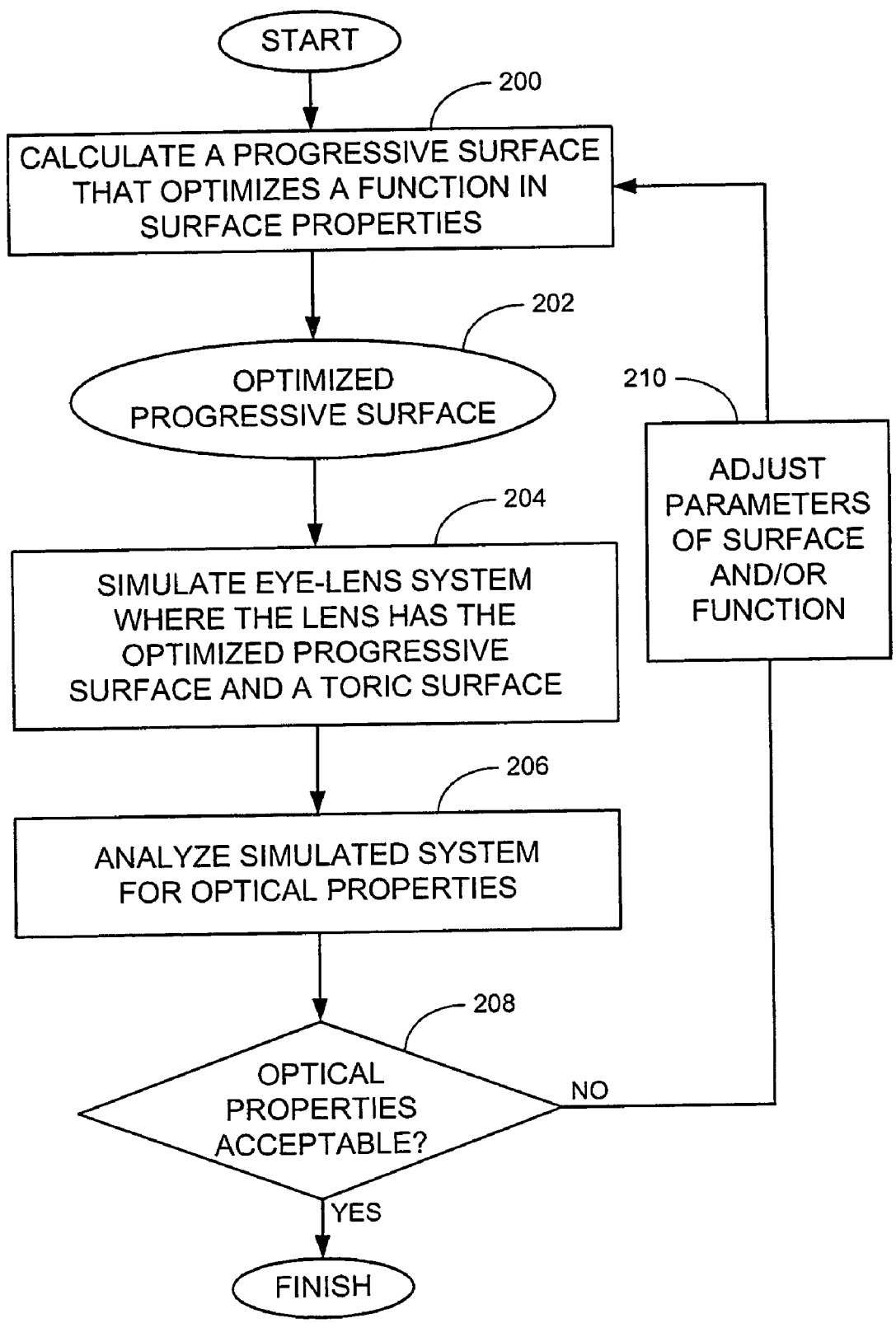
FIG. 2 is a flowchart of an exemplary method for designing a progressive surface of a progressive power semi-finished spectacle lens blank according to some embodiments of the invention.

There are several different ways to design the progressive surface in step 104 of FIG. 1, one of which is illustrated in FIG. 2 and another of which is illustrated in FIG. 3. As shown in FIG. 2, the lens designer calculates a progressive surface that optimizes a function in surface properties (200). This may be done, for example, using the methods described in U.S. Pat. No. 6,302,540 to Katzman et al. The result of the calculation is an optimized progressive surface (202). An eye-lens system is then simulated, where the simulated lens has the optimized progressive surface calculated in step 202 and a toric surface of the specified non-zero cylinder and the specified axis (204). The simulated eye-lens system is analyzed for optical properties (206). If the optical properties are unacceptable (208), then parameters of the surface and/or the function are adjusted by the lens designer (210) and the method resumes from step 200. If the optical properties are acceptable (208), then the optimized progressive surface calculated in step 202 is used for manufacturing the progressive power semi-finished spectacle lens blank.

As shown in FIG. 3, the lens designer calculates a progressive surface that optimizes a function in optical properties of an eye-lens system, where one surface of the lens in the eye-lens system is the progressive surface being calculated and the other surface of the lens is a toric surface of the specified non-zero cylinder and the specified axis (300). This may be done, for example, using the methods described in U.S. Pat. No. 6,655,803 to Rubinstein et al. or U.S. patent application Publication No. 2003/0090623 to Rubinstein et al. The result of step 300 is an optimized progressive surface (302), which is used for manufacturing the progressive power semi-finished spectacle lens blank.

In general, according to some embodiments of the invention, a manufacturer will manufacture a set of different progressive power semi-finished spectacle lens blanks for different combinations of base curve, add power, cylinder and axis. Each progressive power semi-finished spectacle lens blank in the set has an unfinished surface and a progressive surface with a particular base curve and a particular add power. The progressive surface will have been designed to provide optimal optical performance of a lens one surface of which is the progressive surface and another surface of which is a toric surface of a particular cylinder and a particular axis. The progressive surface may be the front surface of the semi-finished spectacle lens blank. Alternatively, the progressive surface may be the back surface of the semi-finished spectacle lens blank.

The different combinations of base curve, add power, cylinder and axis may correspond, for example, i) to distance-vision optical powers in a range of −12.00 D to +12.00 D in steps of 0.25 D;

ii) to add powers in a range of +0.75 D to +3.50 D in steps of 0.25 D;

iii) to cylinder in a range of −0.75 to −4.00 D in steps of 0.25 D; and iv) to axis in a range of 0 degrees to 180 degrees in steps of, for example, 30 degrees, 20 degrees or 15 degrees, or to axis in a range of 0 degrees to 175 degrees in steps of, for example, 25 degrees. Alternatively, the cylinder may be defined in positive diopters.

Other ranges and steps are also within the scope of the present invention. For example, it may be the case that a progressive power semi-finished spectacle lens blank for add power +2.50 D, cylinder −2.50 D and axis 45 degrees provides reasonable correction also for prescriptions having prescribed add power +2.50 D, prescribed cylinder in a range of −2.25 D to −2.75 D and prescribed axis in a range of 35 degrees to 55 degrees.

Certain combinations of base curve, add power, cylinder and axis may be considered less common than other combinations, and therefore may be omitted from the repetitions of the method of FIG. 1 and consequently from the set of progressive power semi-finished spectacle lens blanks. For example, a rare prescription such as SPHERE: −9.00 D, CYLINDER: −3.00 D, AXIS: 40 degrees, ADD: +3.00 D may be excluded from the range of far-vision powers, cylinder, axis and add power covered by the set of progressive power semi-finished spectacle lens blanks.

Certain combinations of base curve, add power, cylinder and axis may yield an improvement in optical performance compared to conventional progressive power semi-finished spectacle lens blanks that is insufficient to justify the increase in additional stock to be kept by an optical lab due to those combinations. Therefore, those combinations may be omitted from the repetitions of the method of FIG. 1 and consequently from the set of progressive power semi-finished spectacle lens blanks. For example, the set of progressive power semi-finished spectacle lens blanks according to embodiments of this invention may include only combinations of base curve, add power, cylinder and axis corresponding to add powers in a range of +2.00 D to +3.50 D and cylinder in range of −2.00 D to −4.00 D.

An optical lab may keep a stock of progressive power semi-finished lens blanks of the set manufactured as described hereinabove. When preparing a progressive power spectacle lens for an individual, the lab surfaces and polishes the unfinished surface of the semi-finished spectacle lens blank to fit the individual's prescription.

FIG. 4 is a flowchart of an exemplary method for producing a progressive power spectacle lens for an astigmatic presbyope from a progressive power semi-finished spectacle lens blank according to some embodiments of the invention. An optical lab receives a prescription of an astigmatic presbyope (400). The prescription includes a prescribed distance-vision optical power, a prescribed add power (or a corresponding prescribed near-vision optical power), a prescribed cylinder and a prescribed axis. The optical lab selects the appropriate progressive power semi-finished spectacle lens blank from the set (402). The selected semi-finished spectacle lens blank has an unfinished surface and a progressive surface having the prescribed add power and a base curve suitable for the prescribed distance-vision optical power.

The optical lab then surfaces the unfinished surface of the selected semi-finished spectacle lens blank with a toric surface having the prescribed cylinder, the prescribed axis, and a spherical curvature such that the progressive power spectacle lens produced from the selected semi-finished spectacle lens blank has the prescribed distance-vision optical power (404).

For example, if the prescription is SPHERE: −1.50 D, CYLINDER: −2.75 D, AXIS: 40 degrees, ADD: +2.50 D, then the selected semi-finished spectacle lens blank will have a progressive surface having the prescribed add power +2.50 D and a base curve suitable for the prescribed distance-vision optical power −1.50 D, namely a base curve of +5.0 D. To continue this example, if the set of progressive power semi-finished spectacle lens blanks includes blanks for the following combinations of base curve, add power, cylinder and axis:

| base curve (D) | 5.0 | 5.0 | 5.0 | 5.0 | 5.0 |
| add power (D) | +2.50 | +2.50 | +2.50 | +2.50 | +2.50 |
| cylinder (D) | −2.25 | −3.00 | −3.00 | −3.00 | −3.75 |
| axis (degrees) | 45 | 45 | 30 | 60 | 45 | then the optical lab will select the most appropriate of these blanks according to the prescribed cylinder and axis.

In this particular case, the most appropriate of these progressive power semi-finished spectacle lens blanks is that with base curve 5.0 D, add power +2.50 D, cylinder −3.00 D and axis 45 degrees. The reason it is most appropriate is that the progressive surface of this semi-finished spectacle lens blank has been designed to provide optimal optical performance of a lens one surface of which is the progressive surface and the other surface of which is a toric surface of cylinder −3.00 D and axis 45 degrees. The unfinished surface of the selected semi-finished spectacle lens blank will be surfaced with a toric surface of cylinder −2.75 D and axis 40 degrees to match the prescription, which is not the same as the toric surface for which the progressive surface of the selected semi-finished spectacle was designed. However, the cylinder −3.00 D and axis 45 degrees of the toric surface for which the progressive surface was designed is close to the prescribed cylinder −2.75 D and the prescribed axis 40 degrees, and therefore the resulting lens may still have better optical performance than a lens having a surface with the prescribed cylinder and prescribed axis that is produced from a progressive power semi-finished spectacle lens blank that was not designed to be matched with a toric surface. Indeed, this selected semi-finished spectacle lens blank has been designed to provide optimal optical performance of a lens having a toric surface closer to the prescribed cylinder and prescribed axis than any other semi-finished spectacle lens blank in the set.

As mentioned hereinabove, a progressive power semi-finished spectacle lens blank having a particular base curve and a particular add power is suitable for a range of distance-vision optical powers, the range being dependent for example, on the material and refractive index of the semi-finished lens blank. This range of suitable distance-vision optical powers is provided to the optical lab by the manufacturer. Therefore, in general, the manufacturer may also provide the optical lab, for each progressive power semi-finished lens blank in the set, with a range of cylinder values and axis values for which the semi-finished lens blank is suitable.

Alternatively, the determination of which progressive power semi-finished lens blank in the set is to be selected to "match" the prescribed cylinder and prescribed axis may be made on the basis of "closeness". There are many possible definitions of "closeness", one of which is closeness in the sense of the associated dioptric matrix, as explained in A. Keating, "A system matrix for astigmatic optical systems: I. Introduction and dioptric power relation", *American Journal of Optometry and Physiological Optics*, Vol. 58, 810–819, published 1981.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A progressive power semi-finished spectacle lens blank having an unfinished surface and having a progressive surface with a particular base curve and a particular add power, wherein the progressive surface is designed by taking into account a toric surface of a particular non-zero cylinder and a particular axis.

2. The progressive power semi-finished lens blank of claim 1, wherein the progressive surface is the front surface of the semi-finished lens blank.

3. The progressive power semi-finished lens blank of claim 1, wherein the progressive surface is the back surface of the semi-finished lens blank.

4. The progressive power semi-finished spectacle lens blank of claim 1, wherein the progressive surface is designed based on one or more optical properties of a lens having said progressive surface and said toric surface.

5. The progressive power semi-finished spectacle lens blank of claim 1, wherein the base curve, the add power, the cylinder and the axis correspond to a particular distance-vision optical power within a range of −12.00 D to +12.00 D.

6. The progressive power semi-finished spectacle lens blank of claim 1, wherein the add power is within a range of 0.75 D to +3.50 D.

7. The progressive power semi-finished spectacle lens blank of claim 1, wherein the cylinder is within a range of −0.75 D to −4.00 D.

8. The progressive power semi-finished spectacle lens blank of claim 1, wherein the axis is within a range of 0 degrees to 180 degrees.

9. A set of different progressive power semi-finished spectacle lens blanks for different combinations of base curve, add power, cylinder and axis, each semi-finished spectacle lens blank in the set having an unfinished surface and having a progressive surface with a particular base curve and a particular add power, wherein the progressive surface is designed by taking into account toric surface of a particular non-zero cylinder and a particular axis.

10. The set of semi-finished lens blanks of claim 9, wherein the progressive surface is the front surface of the semi-finished lens blank.

11. The set of semi-finished lens blanks of claim 9, wherein the progressive surface is the back surface of the semi-finished lens blank.

12. The set of semi-finished lens blanks of claim 9, wherein the different combinations of base curve, add power, cylinder and axis correspond to distance-vision optical powers in a range of −12.00 D to +12.00 D in steps of 0.25 D.

13. The set of semi-finished lens blanks of claim 9, wherein the different combinations of base curve, add power, cylinder and axis correspond to add powers in a range of −0.75 D to +3.50 D in steps of 0.25 D.

14. The set of semi-finished lens blanks of claim 9, wherein the different combinations of base curve, add power, cylinder and axis correspond to cylinder in a range of −0.75 D to −4.00 D in steps of 0.25 D.

15. The set of semi-finished lens blanks of claim 9, wherein the different combinations of base curve, add power, cylinder and axis correspond to axis in a range of 0 degrees to 180 degrees in steps of 15 degrees.

16. The set of progressive power semi-finished spectacle lens blanks of claim 9, wherein the progressive surface is designed based on one or more optical properties of a lens having said progressive surface and said toric surface.

17. A method for producing a progressive power spectacle lens for an astigmatic presbyope, the method comprising:
   receiving a prescribed distance-vision optical power, a prescribed add power, a prescribed cylinder and a prescribed axis for the astigmatic presbyope;
   selecting a progressive power semi-finished spectacle lens blank having a progressive surface with the prescribed add power and with a base curve suitable for the prescribed distance-vision optical power, wherein the progressive surface is designed by taking into account a toric surface with a particular non-zero cylinder related to the prescribed cylinder and a particular axis related to the prescribed axis; and
   surfacing an unfinished surface of the selected semi-finished spectacle lens blank with a tone surface having the prescribed cylinder, the prescribed axis and a spherical curvature such that the progressive power spectacle lens produced from the selected semi-finished spectacle lens blank has the prescribed distance-vision optical power.

18. A method for producing a progressive power spectacle lens for an astigmatic presbyope, the method comprising:
   receiving a prescribed distance-vision optical power, a prescribed add power, a prescribed cylinder and a prescribed axis for the astigmatic presbyope;
   selecting, from a set of different progressive power semi-finished spectacle lens blanks for different combinations of base curve, add power, cylinder and axis, a selected semi-finished spectacle lens blank having a progressive surface with the prescribed add power and with a base curve suitable for the prescribed distance-vision optical power, wherein the progressive surface is designed by taking into account a toric surface with a particular non-zero cylinder and a particular axis which are closer to the prescribed cylinder and the prescribed axis than those for any other semi-finished spectacle lens blanks of the set having a progressive surface with the prescribed add power and with a base curve suitable for the prescribed distance-vision optical power; and
   surfacing an unfinished surface of the selected semi-finished spectacle lens blank with a toric surface having the prescribed cylinder, the prescribed axis and a spherical curvature such that the progressive power spectacle lens produced from the selected semi-finished spectacle lens blank has the prescribed distance-vision optical power.

* * * * *